United States Patent Office 3,380,290
Patented Apr. 30, 1968

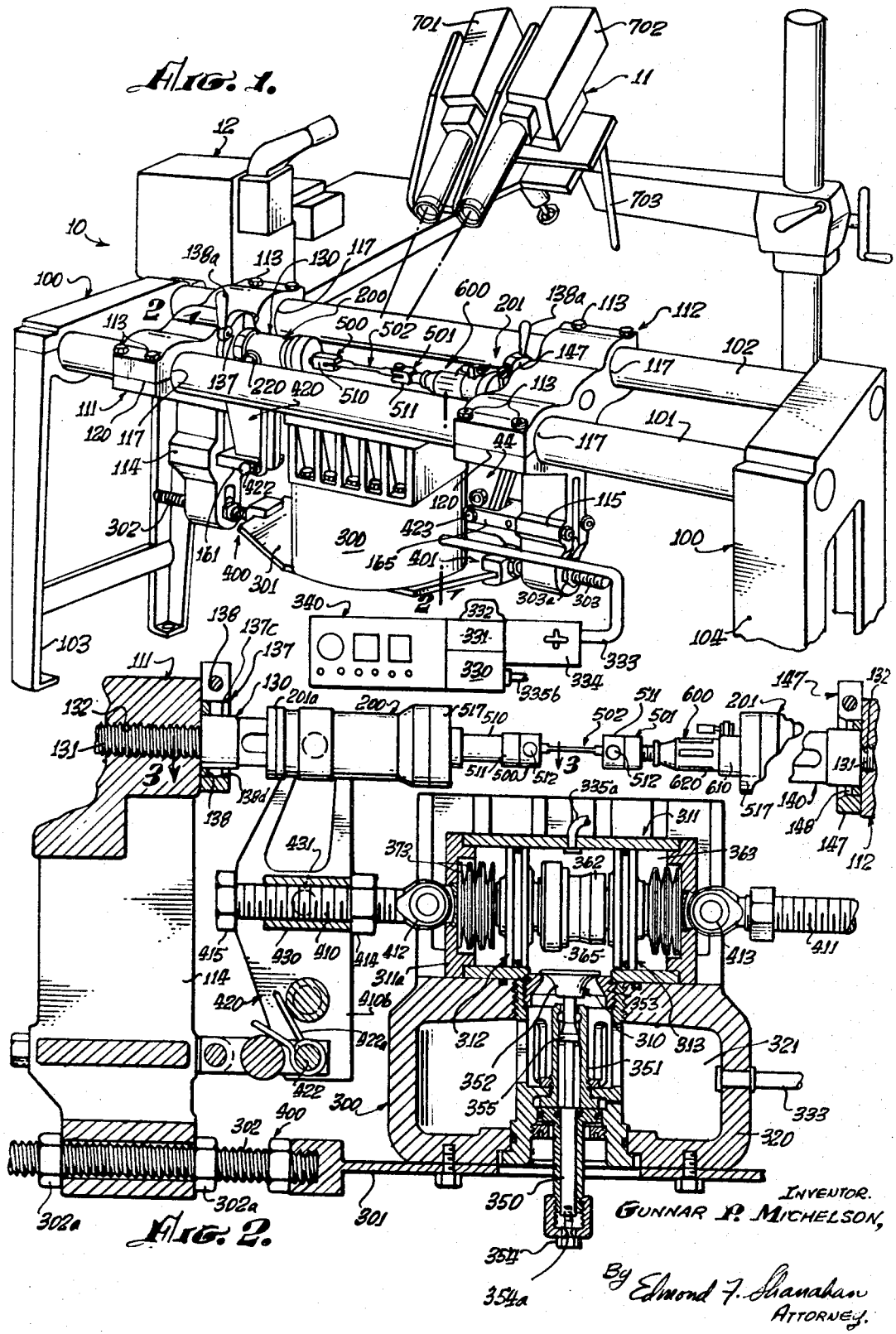

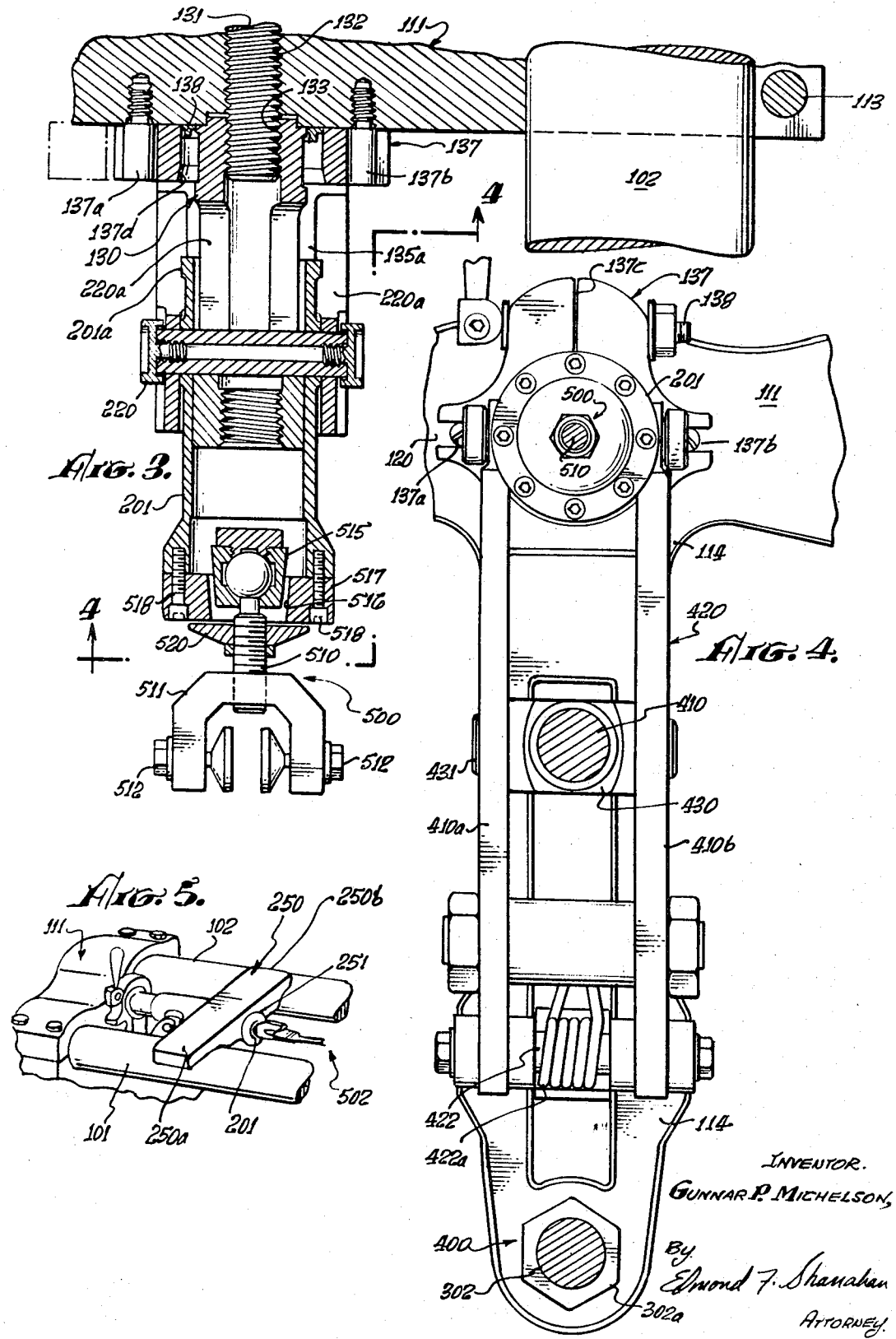

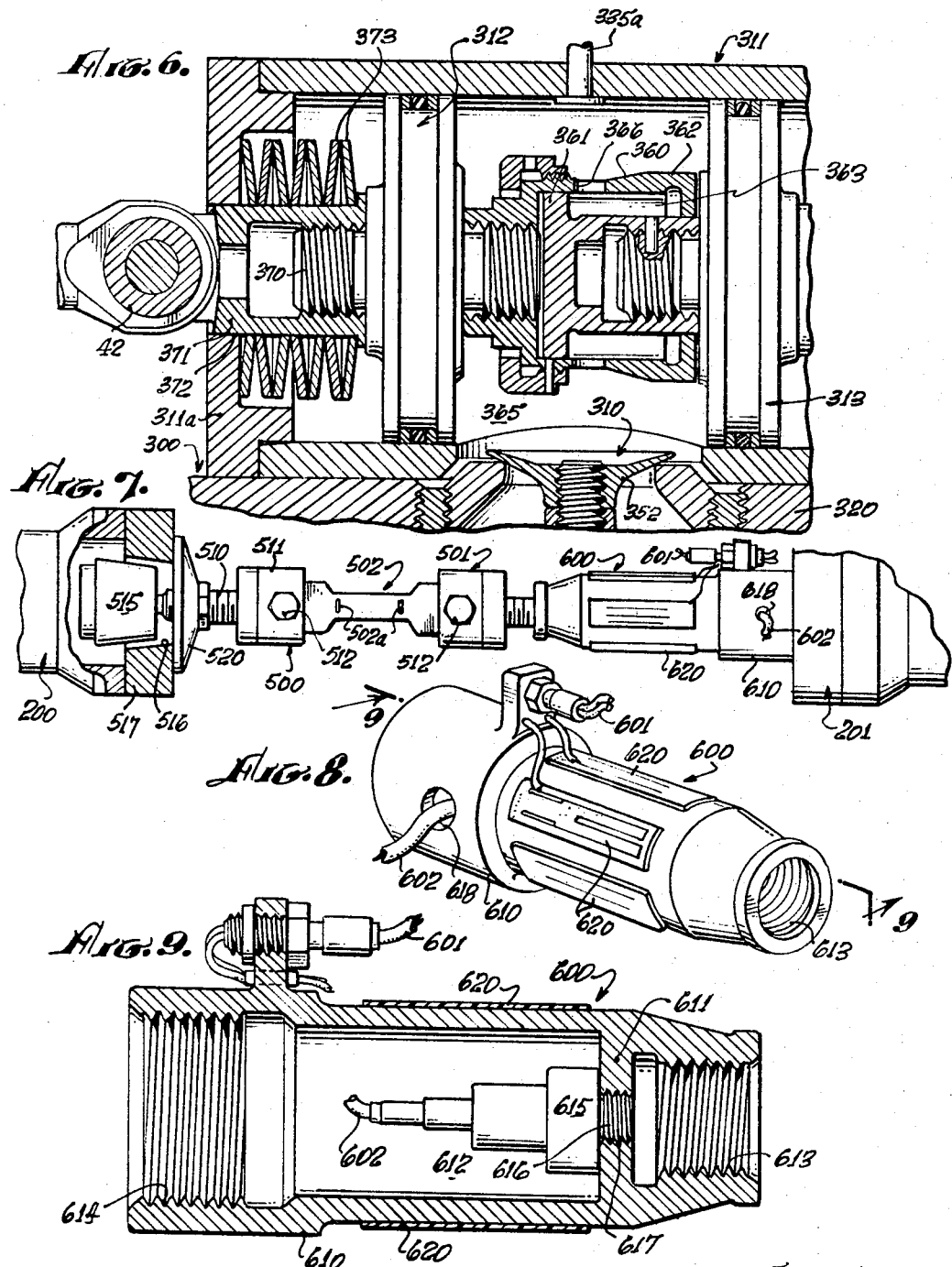

3,380,290
DYNAMIC TESTER WITH TESTING BETWEEN
HYDRAULIC LAUNCHING OF TEST MASSES
AND INELASTIC COLLISIONS
Gunnar P. Michelson, Santa Barbara, Calif., assignor, by mesne assignments, to Plas-Tech Equipment Corporation, Natick, Mass., a corporation of Massachusetts
Filed Dec. 6, 1965, Ser. No. 511,925
10 Claims. (Cl. 73—12)

This invention relates generally to dynamic testers, but more particularly to a dynamic tester in which compressed hydraulic liquid from an accumulator is suddenly released to launch two predetermined test weights in opposite directions along tracks which end at inelastic collision means, with provision for engagement of a test specimen by both test weights during a relatively constant velocity period between said launching and said collision.

Historically, static test machines and techniques for static testing were well-developed, and were considered sufficient for the relatively slow-moving machines which preceded air and space vehicles. Contemporary machines, however, often operate under conditions of very high rates of change in speed, acceleration, momentum, etc., and must simultaneously meet sophisticated design requirements as to weight, environment, etc. Unfortunately, static tests are entirely inadequate for establishing the dynamic behavior of materials.

The dynamic testing devices presently available are not capable of subjecting material test specimens to the range of dynamic testing which would provide the knowledge of strength of materials required in present machine design. Dynamic testers presently available are generally incapable of conducting material testing at high strain rates, or at any precisely pre-determined velocity, within a wide range in which test data is needed. Very few dynamic testers presently available are suited to conducting a wide diversity of tests in the same device, ranging from static testing through the entire range of strain rates up to sixty-five thousand (65,000) inches per inch-minute, at any desired velocity between two thousand (2,000) and sixty-five thousand (65,000) inches per minute, and with an available energy of over three thousand (3,000) inch-pounds.

It is the major object of the present invention to provide a dynamic tester capable of very high strain rates, and of great versability and range in available energy, type of specimen engagement, velocity of test system during testing, as well as load and strain measurement.

It is another important object of the present invention to provide a novel combination of the basic dynamic tester with an optical tracking means for measuring strain, and a load measuring means which is, of itself, novel. With this combination, the test specimen may be tested in the machine of the invention while within a high-temperature furnace, or low-temperature freezing compartment, or under high pressure or vacuum conditions, while complete and precise data is simultaneously being recorded.

The foregoing and many other objects and advantages of the invention are realized by the use of a novel kinetic energy system. The test specimen is mounted between two mass carriers, but not in engagement with them. The two carriers are movable in opposite directions along a pair of coaxial tracks, leading away from the test specimen location. The two mass carriers are loaded with test weights to provide a predetermined velocity range. The kinetic energy imparted to these weights during operation is so great relative to the energy absorbed in fracturing the test specimen that the reduction in kinetic energy and velocity of the system during testing may be ignored in most cases. In relatively rare instances in which change in velocity or kinetic energy of the system during testing becomes important, correction of test data by computation is not difficult.

The dynamic tester of the invention employs a hydraulic means for launching the test masses; sudden release of a compressed liquid in a hydraulic accumulator into a piston and cylinder system accelerates the test masses to a coasting velocity at which testing is to be achieved, usually within an inch or so from a standing start. The liquid employed should have compressability and other properties suitable for such hydraulic actuation; many commercially available hydraulic actuator "fluids" are satisfactory.

Generally, the test specimen is not engaged until after the launching period, and the entire test is conducted while the test masses are coasting at a test velocity and with a kinetic energy which is so large relative to that required by the test, that they may be treated as constant.

At the conclusion of the test, the test masses coast into inelastic collision with catch means which prevent any rebound which might alter the test specimen after completion of the test.

In the preferred combination of the invention, the test specimen is mounted in series with a novel load measuring device, and precise acceleration and strain data are continuously recorded during the test. Simultaneously, a high speed optical tracker, preferably with a pair of observation means, continuously observes two spaced marks on the test specimen, and provides a continuous record throughout the test of deformation of the specimen.

The foregoing and other objects and advantages of my invention may be understood from the following description of one preferred specific embodiment of the invention, which description is to be read in connection with the accompanying drawings, in which:

FIGURE 1 is a right-front perspective view of a dynamic tester constructed according to the invention;

FIGURE 2 is a vertical sectional view, partially broken away, of the central portion of the dynamic tester, as viewed in the direction of the arrows 2—2 in FIGURE 1, at a vertical plane longitudinal with respect to the tester, and located at its longitudinal center line;

FIGURE 3 is a horizontal sectional view, indicated by the arrows 3—3 in FIGURE 2, of a section at a horizontal plane through the axis of the left dynamic load;

FIGURE 4 is a view from the right side at a vertical plate indicated by the arrows 4—4 in FIGURE 3, showing fragmentarily, the left dynamic load;

FIGURE 5 is a fragmentary right front perspective view showing an auxiliary construction for adding large test masses to the dynamic tester;

FIGURE 6 is a vertical sectional view taken at substantially the same plane as that indicated in FIGURE 1 by the arrows 2—2, but showing in sectional detail the hydraulic accumulator used as a launching means for the dynamic tester;

FIGURE 7 is a front elevational view, partially sectioned, of a test specimen and load-measuring means mounted between dynamic loads;

FIGURE 8 is a right perspective view of a preferred load-measuring device; and

FIGURE 9 is a vertical sectional view through the load-measuring device of FIGURE 8, as seen at the vertical, longitudinal, axial plane indicated in FIGURE 8 by the arrows 9—9.

In the perspective view of FIGURE 1, a dynamic tester constructed according to the principles of the invention is indicated generally by the numeral 10. Illustrated with it are a tracking device 11 and a read-out device 12, both of which are extremely useful adjuncts for dynamic tester 10. Although tracking device 11 and read-out device 12 are not novel in themselves, they form an inventive combination when combined with the tester 10 to achieve results not possible heretofore.

The dynamic tester 10 is seen to be comprised primarily of:

A massive frame structure 100 (the right end of which is partially broken away for purposes of compact illustration);

A pair of moveable mass carriers 200 and 201, designed to travel in opposite directions from a central specimen location on coaxial tubular tracks 130 and 140;

A hydraulic accumulator device 300, for containing a compressible liquid;

A pair of launching linkages 400 and 401, by which accumulator 300 launches weight carriers 200 and 201;

A pair of test specimen mounts 500 and 501, shown with a test specimen 502 between them, for placing a test specimen 502 in engagement with moving mass carriers 200 and 201 at the proper instant; and A load detector device 600, mounted in series with the test specimen.

In the preferred embodiment illustrated in the drawings, the frame structure 100 is comprised of two longitudinal side members 101 and 102, which are shown as large, rigid, steel tubes supported horizontally and parallel to one another between rigid pedestals 103 and 104, which are shown as identical massive iron castings.

A pair of massive transverse members 111 and 112 are transversely disposed between longitudinal members 101 and 102, upon which they are slidably locatable, and to which they may be tightly bolted by bolts 113. In the illustrated form of the invention, the transverse members 111 and 112 are massive T-shaped castings with downwardly depending central legs 114 and 115.

Each of the transverse members 111 and 112 are provided with a pair of side bore holes 117, in which the longitudinal members 101 and 102 are closely received. Also, the outer ends of the transverse members 111 and 112 are divided into upper and lower parts by a horizontal gap, as indicated in 120, so that transverse members 111 and 112 may be slid to any desired position on the longitudinal members 101 and 102 while the bolts 113 are loose, and then clamped in position by tightening the bolts 113. The casting material of members 111 and 112 should be resilient enough to permit slight closure of the horizontal gaps 120.

The perspective view of FIGURE 1 reveals that the test specimen 502, specimen mounting means 500 and 501, the load measuring means 600, and the mass carriers 201 and 202 are disposed substantially coaxially with one another along a center line between the tracks 101 and 102.

Mass carriers 201 and 202, as seen in the side view of FIGURE 2, and the horizontal sectional view of FIGURE 3, are actually sleeves which are telescopically received over tracks 130 and 140, which latter are tubular studs projecting horizontally and inwardly toward each other from the centers of the bridge portions 115 and 116 of the stops 111 and 112. Tracks 130 and 140 are mounted to the inner faces of the transverse members 111 and 112, as illustrated for track 130 in FIGURE 3, by means of a single large screw 131 which passes through a threaded central bore 132 in transverse member 111, and a mating coaxial threaded bore 133 in tubular track 130.

Each of the cantilevered tubular tracks 130 and 140 is encircled near its base with a catch, as indicated by numerals 137 and 147, respectively. In the form of the invention illustrated, the catches 137 and 147 are split rings seated against the inner faces of the transverse members 111 and 112. Preferably catches 137 and 147 bolted to the inner faces of transverse members 111 and 112; for catch 137, this is illustrated in FIGURE 3, the bolts being indicated by the numerals 137a and 137b.

The catching stop ring 137 is seen in front elevation in FIGURE 4. Although partially concealed behind the structure of mass carrier 201, it is seen to be split at a vertical axial plane as indicated at 137c. A toggle bolt 138, with an associated toggle cam and handle 138a are provided for releasably tightening the split ring catch 137 into stopping and catching position around the carrier track stud 130. The interior surface 137d of ring 137 has a somewhat conical entrance, preferably, but is cylindrical for most of its bore length, with the diameter just small enough to make tight, telescoping engagement with a cylindrical collision ram 201a at the collision end of the mass carrier 201.

Preferably, the catch ring 137 is made of beryllium copper, or some such material, which can be subjected, without substantial damage, to the collision impact of mass carrier 201. The internal diameter of the cylindrical portion of the catch ring 137 is actually "underfit," i.e. it is smaller in diameter than the external diameter of the collision ram 201a. As will be explained hereinafter, each operation of the tester 10 (for dynamic testing) involves launching the mass carriers 201 and 202 in opposite directions, allowing them to move at high velocity, without hindrance, outwardly from each other, along the tracks 130 and 140, into collision with the catches 137 and 147.

It is much preferred that there be no rebound from the catches 137 and 147. The magnitude of energy to be dissipated will depend upon the total amount of test mass the mass carriers 201 and 202 are carrying for the particular test, and the launching energy which has been imparted to them by the operation of hydraulic accumulator 300.

In a maximum energy test, it may happen that the mass carriers 201 and 202 are rammed all the way through the internal bore of the catch rings 137 and 147. In order to prevent a possibly damaging collision with the transverse members 115 and 116, the tracks 130 and 140 are encircled, at their base, by emergency stop rings 138 and 148, which absorb the energy of the collision by undergoing destructive deformation. Preferably, these rings are split into aluminum semicircles for ease of installation and removal, and are formed with a free-standing annular shoulder projecting in an up-travel direction, i.e. for head-on collision with one of the approaching mass carriers 201 or 202. It will be appreciated that the emergency stops can be used only once. If they are actually hit by the mass carriers 201 or 202, they are destroyed in the process of bringing the mass carriers to a full stop.

The accumulator 300 is supported on an accumulator platform 301, which is, in turn, bolted to the lower ends of the depending legs 114 and 115, by bolts 302 and 303; the latter have holding nuts 302a and 303a, respectively, which may be moved to permit relocating the transverse members 111 and 112 at increased or reduced longitudinal spacing from each other.

When the accumulator 300 is operated, the opening of a valve 310 suddenly introduces hydraulic fluid into a cylinder 311, and a pair of opposed pistons 312 and 313 are suddenly, rapidly, and with great force expelled outwardly along the longitudinal axis of cylinder 311. The outer ends of the pistons 312 and 313 are pivotally connected to push rods 410 and 411 by pivotal connections 412 and 413 respectively. The push rods 410 and 411 are threaded to receive a pair of travel limiting nuts, an inboard launching nut 414 and an outboard decelerating nut 415. The two push rods 410 and 411 transmit equal and opposite launching forces to a pair of levers 420 and 421. Levers 520 and 421 are pivotally mounted at their lower ends by fulcrum pivots 422 and 423, respectively; at their upward ends, they engage and launch outwardly the mass carriers 201 and 202 by means of transverse ends 220 (seen in plan cross-section in FIGURE 3).

The sectional view of FIGURE 2 reveals that push rod 410 engages the lever 420 through a sleeve 430, which is pivotally mounted to lever 410 by a transverse pivot mounting 431, which is located between the sideplates 410a and 410b which comprise lever 410, and are best seen in the elevational view of FIGURE 4. The push rod 410 is freely slideable within sleeve 430, but when the dynamic tester 10 is at rest, the lever arm 410 is urged inwardly to rest against the launching nut 414 by the resilient pressure of a coil spring 422a at the fulcrum 422.

It will be understood that the pin 220 is received in vertically elongated slots 220a, which permit the slightly arcuate movement of the upper end of lever 420.

The horizontal sectional view of FIGURE 3 and the vertical sectional view of FIGURE 7 reveal that the grip 500 is not engaged during the initial outward movement of mass carrier 201. It is seen from the details of FIGURE 3 that grip 500 is comprised of an axial bar 510, which carries at its specimen-gripping end a U-bar 511 with screws 512 to clamp a test specimen 502.

The opposite end of the bar 510 is provided with a conical shoulder 515, which engages carrier 201, upon the latter's outward movement, by seating in the central conical hole 516. In the construction illustrated, the conical hole 516 is formed by a ring 517 which is bolted by bolts 518 to the end of mass carrier 201.

A spacer ring 520 is threaded onto the threaded bar 510, and serves to locate the conical shoulder 515 at just the required distance in a down-travel direction from the ring 516. By adjusting the ring 520, the operator can make certain that the mass carrier 201 does not engage the specimen grip 500 until after it has moved through a pre-determined distance, usually the distance corresponding to a launching period as will be explained hereinafter.

At the opposite end of the test specimen 502, the opposite specimen grip 501 and mass carrier 202 may or may not have a delayed engagement construction corresponding to cone 515 and internal conical ring 517. In the particular embodiment illustrated, the delay in engagement of the test specimen is achieved entirely by one cone and ring pick-up, namely cone 515 and ring 517, associated with the left end mass carrier 201.

At the right end of the machine, as illustrated in FIGURE 7, a load measuring device 600 is mounted directly to the mass carrier 202; at its inner end, load measuring device 600 threadably receives a grip 501 substantially identical to grip 500, except that the grip 501 is directly threaded into a central threaded bore in the end of load measuring device 600, without provision for any motion of mass carrier 202 prior to engagement, as in the case of mass carrier 201.

The construction of the accumulator 300 is illustrated in the sectional view of FIGURE 2. An accumulator housing 320 (preferably formed of a massive and rigid iron casting) has a high pressure chamber 321 in its lower portion and a launching cylinder 311 in its upper portion.

A compressible liquid suitable for use in hydraulic actuator systems of this type is stored at atmospheric pressure in an external reservoir 330, seen in FIGURE 1. By means of a pump 331, driven by an electric motor 332, the compressible liquid can be pumped through a high pressure line 333, which line includes a control valve 334, to the chamber 321. By means of valve 334, high-pressure liquid from pump 331 can be delivered to chamber 321 through line 333 or passed through an internal bypass passage back to a low pressure reservoir 330.

An instrument panel with suitable gauges and controls is provided at 340, so that the operator can deliver liquid to chamber 321 until the desired high pressure is reached. As will be explained hereinafter, the tester 10 may be operated in each of several velocity and energy ranges, and selection of values within each range is accomplished by selecting the appropriate pressure in accumulator 300, as determined by prior calibration tests.

Valve 334 also has a position which permits reverse flow in high pressure line 333 to accomplish the quick return of liquid from chamber 321 to low pressure reservoir 330 at the end of a test. Also, the interior of cylinder 311 is at all times in open communication with low pressure reservoir 330 so a small conduit indicated by the numerals 335a in FIGURE 2 and 335b in FIGURE 1. This conduit permits high pressure liquid from interior cylinder 311 to pass freely to low pressure reservoir 330, at all times, but at a very low rate of flow because of its restricted cross-section. Thus, the launching effort within cylinder 311 on launching pistons 312 and 313 is not appreciably reduced during the very brief launching time, but after the launch period, the system rapidly falls off to atmospheric pressure as liquid bleeds away from the cylinder 311 to low pressure reservoir 330 through the line indicated by numerals 335a and 335b (the entire line comprising the bleed conduit is not illustrated, since it would clutter the drawing without adding any necessary information).

The release valve 310 is designed for relatively instantaneous opening to fully open position. The valve stem 350 is vertically reciprocable in a valve sleeve structure 351, which is axially positioned in the substantially cylindrical high pressure chamber 321. The valve head 352 is held tightly against the valve seat 353 by a retaining bolt 354. The neck of the retaining bolt 354 is reduced in cross-section at 354a so that the bolt 354 can be manually sheared by wrenching, when it is desired to release the liquid at high pressure from high pressure chamber 321 into the cylinder 311.

The upward movement of valve 310 is limited by an annular shoulder 355, which comes to a stop against the upper end of the valve sleeve 351. It will be understood that hydraulic liquid from chamber 321 is entrapped above the shoulder 355, after the valve has risen through part of its path, so that a dashpot deceleration effect is accomplished.

The cross-sectional view of FIGURE 6 reveals that the pistons 312 and 313 are connected to one another by a decelerating dashpot 360. It will be understood that the decelerating dashpot 360 is a telescoping system comprised of an annular piston 361 attached to actuating piston 313; and a cylinder 362, which is attached to actuating piston 312, provides an annular chamber 363 for the accommodation of annular piston 361.

When the dynamic tester 10 is operated by opening valve 310 to admit high pressure liquid into the space 365 between actuating pistons 312 and 313, these two pistons move outwardly away from one another without hindrance from dashpot 360, which de-telescopes freely until after the annular cylinder 361 moves to the right of the radial openings 366 in cylinder 362. Thereafter, however, the pistons 312 and 313 are decelerated because further movement to the right of annular piston 361 requires compression of liquid trapped in the annular space 363.

The pistons 312 and 313 are both connected to the associated push rod pivots 412 and 413, respectively, in exactly the same way; consequently, only the connection of piston 312 to pivot 412 will be illustrated and explained in detail in connection with FIGURE 6. The outer end of piston 312 is seen to be provided with a threaded axial stud 370. An internally threaded tubular piston extension transmits the longitudinal movement of piston 312 to push rod 410 through the pivot 412. It will be seen that tubular extension 371 is reciprocable in a central bore 372 in the end 311a of cylinder 311.

As piston 312 moves to the left, it encounters a resilient mechanical spring in the form of a series of dished washers 373, which are assembled face to face. These washers at first offer little resistance to the launching movement of piston 312 over the short distance it is intended to travel during operation of the tester 10. However, after the conclusion of a test, the spring washers 373, which are associated with both the launching pistons 312 and 313, exert a pressure to restore these pistons to their starting point, at the same time forcing the hydraulic liquid from cylinder chamber 365 back to the low pressure reservoir 330.

The front elevational view of FIGURE 7 shows the test specimen 502 mounted between grips 500 and 501, which are engaged, during dynamic testing, by the rapidly moving mass carriers 201 and 202. The load to which the test specimen 502 is subjected at each instant of time during the test operation is detected by the load detector 600, which is mounted in series with the test specimen 502, between grip 501 and the right end mass carrier 202.

During a test, electrical signals are transmitted from test detector 600 to read-out device 12 through electrical instrumentation cables 601 and 602. In the particular embodiment illustrated, cable 601 transmits a single stress measuring signal, and cable 602 transmits a single acceleration measuring signal; however, it will be understood that the load detector 600 and associated cables 601 and 602 might be employed for the detection and transmission of several strain measuring signals, and/or several acceleration measuring signals, and/or other load measuring or load environment data.

The construction of load detector 600 is illustrated in the perspective view of FIGURE 8 and the longitudinal sectional view of FIGURE 9. A tubular body 610 is provided with a transverse internal partition 611, which separates its interior into an accelerometer chamber 612 and an internally threaded bore 613 for accommodation of the threaded portions of grip 501. The opposite end of the tubular body 610 has a somewhat larger internally threaded bore 614 by means of which it may be threadably mounted to mass carrier 202 as illustrated in FIGURE 7.

An accelerometer 615 is longitudinally disposed inside accelerometer chamber 612 and mounted to wall 611 by a threaded base stud 616 which is received in an axial, threaded hole 617 in wall 611. The beginning of accelerometer signal cable 602 is seen issuing from the end of accelerometer 615, in FIGURE 9; the cable finds its way out of the tubular body 610 by means of a radial hole 618, seen in FIGURES 7 and 8. It will be understood that the accelerometer 615 is coaxial with the test speciment 502 and its entire associated dynamic testing system, and is designed to measure acceleration along said axis. Actually, different types of accelerometer may be required for accurate measurement of different acceleration ranges.

A number of strain guages 620 are attached by adhesive means to the exterior surface of the tubular body 610. As illustrated in FIGURES 7 and 8, four or more strain gauges are connected in series to produce a single strain measurement signal for transmission through cable 601. The strain gauges 620 are longitudinally disposed on the cylindrical exterior surface of sleeve 610, but are circumferentially spaced from one another around the circumference of tubular body 610.

In order to operate the dynamic tester 10 in each of its several ranges of testing operation, it is necessary to load the mass carriers 201 and 202 with test weights suitable for each test range. The test weights must be provided in matching pairs, since mass carriers 201 and 202 must be loaded equally for each test range. However, since member of the pair of test weights is identical, and is mounted identically, only a single test weight 250 is illustrated in FIGURE 5. Test weight 250 is typically a block of cast iron with a central bore opening 251 for the accommodation of mass carrier 201. The test weight 250 has lateral extensions 250a and 250b which slide freely on the upper surfaces of the longitudinal members 101 and 102. It will be understood that mass carrier 201 does not experience any downward component of force from test weight 250, since that weight is entirely supported in a movable manner on longitudinal member 101 and 102. However, weight 250 is freely slideable, integrally with mass carrier 201, in a longitudinal direction; it is assumed that the test machine 10 has been properly levelled so that longitudinal forces are strictly horizontal forces. Preferably, suitable lubricant or slippery tape is employed between the relatively sliding surfaces between weight 250 and its supporting longitudinal members 101 and 102, to minimize frictional resistance to longitudinal sliding.

Also, it will be obvious that as larger and larger weights are required, the weight-carrying and moving mechanism will have to be substantially larger and more cumbersome than the relatively small weight illustrated in FIGURE 5. It is a much preferred form of the invention to combine data from load detector 600 with sumultaneously and continuously collected measurements of elongation of the test specimen 502. The preferred form of the invention for accomplishing this is to employ tracker or extensometer 11, which is comprised of a pair of opto-electronic observation means 701 and 702, mounted on a massive adjustable support 700. A tracker suitable for use as opto-electronic observing means 701 and 702 is described in United States Patent 3,161,725. A suitable extensometer is sold commercially by the Optron Corporation as its model 680-X.

It will be noted from FIGURE 7 that the test specimen 502 is marked at two longitudinally spaced points with transverse marks 502a and 502b. Before beginning a test, the extensometer 11 is positioned with its two observing devices 701 and 702 focused on the marks 502a and 502b as targets. During the test operation, power is supplied to the extensometer 11, and test data is collected therefrom by an extensometer cable 703. At a point not shown, cable 703 delivers its extensometer data to read-out device 12, which may incorporate suitable display, recording, and computing devices for reducing the data received from load detector 600 and extensometer 11, either simultaneously and continuously during tests, or subsequent to test.

In operating the dynamic tester 10, the first consideration which will ordinarily determine the mode of operation will be the velocity at which it is desired to test the test specimen 502. The higher the velocity, the smaller the masses required to be loaded on mass carriers 201 and 202. The lowest velocity ranges call for loading mass carriers 201 and 202 with the largest test weights, either directly in the form illustrated in FIGURE 1 for test weight 250, or in the form of some associated flywheel mechanism not illustrated. For each successively higher range of velocities, a pair of test weights 250 required will step downward in size. For the highest range of velocity, the mass carriers 201 and 202 will provide all the weight needed, and need not be supplemented with any additional mass 250.

Within each velocity range, any specific desired velocity may be selected for the test by filling the accumulator high pressure chamber 321 with hydraulic liquid until it attains a pressure which, with the particular test weights, will produce the desired velocity.

Of course, the test specimen will absorb a certain amount of energy during testing, and will produce some deceleration of the dynamic system of the tester 10. Generally, however, the dynamic system of the tester 10 may be assumed to be moving at a substantially constant velocity during testing, since the energy absorbed by the test specimen 502 is insignificant in comparison with the dynamic energy stored in the moving parts of dynamic tester 10 during the test. In an exceptional case in which the test specimen absorbs an unusually large amount of energy, the test masses and accumulator pressures will be higher than in a standard test. However, it is generally simpler to reduce the size of the test specimen to a point in which its energy absorption is insignificant relative to the total kinetic energy of the testing system at the particular velocity of testing.

In most cases, it is desired that the test specimen 502 remain static and unstressed during the period of launching the mass carriers 201 and 202, with their associated moving parts, including test weights 250, launching linkages 400 and 401, etc. During this launching period, the mass carriers 201 and 202 may move away from each other as much as one or two inches. The exact duration of the launching period, and the distance through which the weight carriers 201 and 202 are moved before acceleration is terminated, will be determined by various adjustments to the decelerating dashpot system 360, and the launching linkages 400 and 401. It is only after the conclusion of the launching period, and at the beginning of the coasting period of the dynamic system of the tester 10 that the test specimen 502 begins to experience the testing stress as engagement of the conical shoulder 515 by ring 517 occurs.

In most cases, the test specimen is elongated to fracture entirely during a coasting period, subsequent to any significant acceleration, and prior to any significant deceleration.

As already described, the mass carriers 201 and 202, together with any test weights they may be carrying, coast into an inelastic collision with their respective catches 137. Preferably, the entire dynamic system is brought to a stop without any rebound. Thus, the operator can inspect the test grips 500 and 501, and the test specimen 502 to see if any twisting or slipping occurred during the test; if there has been no rebound, the operator can be sure that slip marks or distortion cannot be attributed to rebound damage.

It is important for valve 310 to be opened instantaneously, so that the hydraulic fluid stored under pressure in high pressure chamber 321 is released into the launching cylinder 311 with great rapidity. It is for this reason that release of the valve 310 for each testing operation is accomplished by shearing the head off the bolt 354. A new shear bolt 354 must be available for each operation of the tester, and must be threaded into valve stem 350 and tightened into position to bring valve 311 into tight closure by means of a torque wrench before each test.

Also, it will be apparent that a test specimen 502 could be subjected to a static test simply by leaving valve 311 open, and operating pump 331, to deliver hydraulic fluid through line 333, to chamber 321, and to open valve 310 until the pressure on pistons 312 and 313 is sufficient to exert a static fracture force on specimen 502.

Although the drawings and foregoing description present one preferred specific embodiment of the invention, it will be appreciated that the dynamic tester may be modified, improved, or simplified in many ways without departing from the scope of the invention which is defined in the claims set forth hereinafter.

In its most elegant form, the tester provides a means for continuously recording and/or computing extension of the specimen, stress in the specimen, velocity during the test, and acceleration during the test.

The dynamic tester 10 may be operated with load detection means 600 substantially more complicated, or less complicated, than the specific embodiment illustrated. For example, sufficient data may be produced by a load detector which measures test force only, acceleration being assumed to be zero.

The invention may be used in a dynamic tester which does not make use of load detector 600, extensometer 11, or read-out device 12. Various test techniques and equipment known to the prior art may be used to make test measurements of the specimen 502 during and following testing.

It will be evident, however, that the combination illustrated in FIGURE 1 provides an extremely versatile tester. For example, the test specimen 502 may be housed during testing in a refrigerated chamber, or a furnace, with a suitable window, so that complete extensometer data and load detection data may be collected continuously throughout the test in spite of the difficult environmental conditions required.

What is claimed is:

1. A dynamic tester for subjecting a test specimen to a dynamic load along a test specimen longitudinal axis, which tester includes:
   a frame disposed around a test specimen location, said location being characterized by a longitudinal axis for longitudinal disposition of a test specimen;
   a pair of track means mounted in said frame along said longitudinal axis, one at each end of said test specimen location;
   a pair of moveable mass means, one moveable on each of said track means;
   a pair of test specimen attachment means, one for attachment at each end of a test specimen in said test specimen location, said attachment means being supported between said moveable mass means, and connected thereto during at least part of the time during an operation of said tester;
   a hydraulic accumulator;
   pump means for introducing a compressible liquid into said hydraulic accumulator up to a pre-selected pressure;
   a hydraulic cylinder means;
   a pair of pistons in said cylinder, each of said pistons being adapted to move outwardly away from a central region in said cylinder;
   releasable valve means between said hydraulic accumulator and said central region of said cylinder to permit the sudden introduction of hydraulic liquid under high pressure from said hydraulic accumulator into said central region; and
   a pair of mechanical transmission means, one at each end of said cylinder, said means being in driven engagement with said pistons, and in driving engagement with said moveable masses, whereby release of hydraulic fluid from said accumulator to said cylinder operates to launch said pair of moveable masses in opposite directions along said longitudinal axis.

2. A dynamic tester as set forth in claim 1, which includes:
   a pair of catch means, mounted in said frame along said longitudinal axis, one at the outer end of each of said tracks, said catch means adapted to stop and catch said outwardly moving masses at the termination of their travel along said tracks.

3. A dynamic tester as set forth in claim 1, which includes:
   an engagement means for placing said moveable masses in engagement with said test attachment means to exert a test load along said longitudinal axis of said test specimen beginning after said moveable mass means have traveled a pre-selected distance.

4. A dynamic tester as described in claim 1 in which:
   said piston and cylinder means are disposed in said frame along an axis parallel to said test location longitudinal axis; and
   said mechanical transmission means comprises a pair of lever means, each moveably mounted on a fulcrum pivot in said frame, one lever located at each end of said cylinder and connected to one of said pistons in said cylinder at an intermediate point, whereby release of hydraulic fluid from said accumulator to said cylinder operates to drive said levers and said moveable masses in opposite directions.

5. A dynamic tester as described in claim 1 in which:
   said pair of pistons in said cylinder are interconnected by a dashpot piston and cylinder means, and said dashpot piston is adapted to begin compression of said hydraulic fluid captive in said dashpot cylinder when said pair of outwardly moving pistons have moved a predetermined distance away from said central region, thereby initiating deceleration of said pair of outwardly moving pistons.

6. A dynamic tester as described in claim 1 in which:
   a load-detecting device is mounted in series with said test specimen along said test specimen longitudinal axis between said moveable masses.

7. A dynamic tester as described in claim 6 which includes:
an optical extensometer comprised of a pair of optoelectronic observing means for observing a pair of spaced marks on said test specimen, and read-out means for simultaneously and continuously reading both extension of and load on said test specimen.

8. A dynamic tester as described in claim 1 in which: the ends of said cylinder means are provided with resilient decelerating mechanical spring means for assisting in the deceleration of said outwardly moving pistons beginning after they have moved outwardly a predetermined distance.

9. A dynamic tester as described in claim 2 in which: each of said outwardly moveable masses is provided with a plunger means forwardly extending in the direction of motion of said mass, and each of said catches is a sleeve of material highly resistant to shattering, said sleeve being longitudinally split along at least one line, and each of said sleeves including a clamping means for closing said sleeve to decelerate said masses while receiving said plungers in telescoping engagement.

10. A dynamic tester as described in claim 1 in which: each of said moveable mass means is comprised of a mass carrier moveable on one of said tracks, and a pair of masses, one of said masses riding on each of said carriers, and each of said masses being supported on adjacent members of said frame, but slideably moveable thereon with horizontal movement of said outwardly moving masses along said longitudinal axis.

References Cited

UNITED STATES PATENTS

| | | | |
|---|---|---|---|
| 2,932,951 | 4/1960 | Ottestad et al. | 73—12 |
| 3,102,421 | 9/1963 | Cosner et al. | 73—97 |
| 3,103,116 | 9/1963 | Kohli | 73—12 |
| 3,142,980 | 8/1964 | Anderson | 73—12 |

RICHARD C. QUEISSER, *Primary Examiner.*

JAMES GILL, *Examiner.*

D. SCHNEIDER, *Assistant Examiner.*